US009762347B2

(12) United States Patent
Shelby et al.

(10) Patent No.: US 9,762,347 B2
(45) Date of Patent: Sep. 12, 2017

(54) DYNAMIC CONFIGURATION OF A FLEXIBLE ORTHOGONAL FREQUENCY DIVISION MULTIPLEXING PHY TRANSPORT DATA FRAME PREAMBLE

(71) Applicant: ONE Media, LLC, Hunt Valley, MD (US)

(72) Inventors: Kevin A. Shelby, Austin, TX (US); Michael J. Simon, Frederick, MD (US); Mark Earnshaw, Kanata (CA); Zahir Jaffer Raza, Waterloo (CA)

(73) Assignee: One Media, LLC, Hunt Valley, MD (US)

( * ) Notice: Subject to any disclaimer, the term of this patent is extended or adjusted under 35 U.S.C. 154(b) by 0 days.

(21) Appl. No.: 14/835,260

(22) Filed: Aug. 25, 2015

(65) Prior Publication Data

US 2016/0056910 A1 Feb. 25, 2016

Related U.S. Application Data

(60) Provisional application No. 62/041,478, filed on Aug. 25, 2014.

(51) Int. Cl.
*H04L 27/06* (2006.01)
*H04L 1/02* (2006.01)
(Continued)

(52) U.S. Cl.
CPC .......... *H04J 13/0062* (2013.01); *H04J 13/14* (2013.01); *H04L 27/2613* (2013.01);
(Continued)

(58) Field of Classification Search
USPC ....... 375/130, 135, 136, 146, 147, 148, 149, 375/150, 142, 144, 145, 140, 137, 219,
(Continued)

(56) References Cited

U.S. PATENT DOCUMENTS 6,289,000 B1 9/2001 Yonge, III
6,961,388 B2 11/2005 Ling et al.
(Continued)

FOREIGN PATENT DOCUMENTS

CN 105007145 A 10/2015
CN 105007146 A 10/2015
(Continued)

OTHER PUBLICATIONS

International Search Report and Written Opinion; International Application No. PCT/US2015/046719; dated Nov. 19, 2015.
(Continued)

*Primary Examiner* — Linda Wong
(74) *Attorney, Agent, or Firm* — Sterne, Kessler, Goldstein and Fox P.L.L.C.

(57) ABSTRACT

A method for operating a transmitting device to communicate with a receiving device is described herein. The method includes the step of the transmitting device selecting a root index value from a set of root index values. The method further includes the step of the transmitting device generating a frequency domain Constant Amplitude Zero Auto-Correlation sequence based on the selected root index value. The method further includes the step of the transmitting device modulating the Constant Amplitude Zero Auto-Correlation sequence by a pseudo-noise sequence. The method further includes the step of the transmitting device generating an Orthogonal Frequency Division Multiplexing symbol, wherein the frequency domain Constant Amplitude Zero Auto-Correlation sequence modulated by the pseudo-noise sequence defines subcarrier values for the Orthogonal Frequency Division Multiplexing symbol. The method further includes the step of the transmitting device transmitting the Orthogonal Frequency Division Multiplexing symbol as
(Continued)

an initial Orthogonal Frequency Division Multiplexing symbol of a preamble of a frame to the receiving device.

22 Claims, 11 Drawing Sheets

(51) Int. Cl.
*H04L 27/00* (2006.01)
*H03K 9/00* (2006.01)
*H04J 13/00* (2011.01)
*H04J 13/14* (2011.01)
*H04L 27/26* (2006.01)

(52) U.S. Cl.
CPC ...... *H04L 27/2656* (2013.01); *H04L 27/2663* (2013.01); *H04L 27/2692* (2013.01)

(58) Field of Classification Search
USPC ....... 375/220, 221, 222, 259, 285, 284, 271, 375/278, 295, 316, 298, 302, 308, 322, 375/324, 329, 332, 331, 334, 354, 355, 375/362
See application file for complete search history.

(56) References Cited

U.S. PATENT DOCUMENTS

| | | | |
|---|---|---|---|
| 7,778,151 B2* | 8/2010 | Bertrand | H04J 11/005 370/208 |
| 7,920,884 B2 | 4/2011 | Agrawal et al. | |
| 8,577,299 B2 | 11/2013 | Agrawal et al. | |
| 8,619,540 B2* | 12/2013 | Li | H04J 11/005 370/208 |
| 8,804,675 B2 | 8/2014 | Gutierrez et al. | |
| 9,036,567 B2 | 5/2015 | Krishnamoorthi et al. | |
| 9,043,687 B2 | 5/2015 | Ko et al. | |
| 9,179,440 B2 | 11/2015 | Gutierrez et al. | |
| 9,253,428 B2 | 2/2016 | Allison, III et al. | |
| 9,258,800 B2 | 2/2016 | Kwak et al. | |
| 9,300,327 B2 | 3/2016 | Ko et al. | |
| 9,307,273 B2 | 4/2016 | Yoo et al. | |
| 9,363,040 B2 | 6/2016 | Ko et al. | |
| 9,369,325 B2 | 6/2016 | Kim et al. | |
| 9,386,562 B2 | 7/2016 | Gutierrez et al. | |
| 2008/0051125 A1* | 2/2008 | Muharemovic | H04W 72/1231 455/519 |
| 2008/0075184 A1* | 3/2008 | Muharemovic | H04L 1/1854 375/260 |
| 2008/0095254 A1 | 4/2008 | Muharemovic | |
| 2008/0273582 A1 | 11/2008 | Gaal et al. | |
| 2009/0073944 A1 | 3/2009 | Jiang et al. | |
| 2010/0067461 A1* | 3/2010 | Kwak | H04L 1/0026 370/329 |
| 2010/0220664 A1 | 9/2010 | Hooli et al. | |
| 2011/0182328 A1* | 7/2011 | Imamura | H04L 5/0016 375/146 |
| 2012/0163348 A1* | 6/2012 | Han | H04L 5/0007 370/336 |
| 2012/0294273 A1* | 11/2012 | Ahn | H04L 1/0028 370/329 |
| 2013/0018934 A1 | 1/2013 | Kim et al. | |
| 2013/0208679 A1 | 8/2013 | Joung et al. | |
| 2013/0223389 A1* | 8/2013 | Papasakellariou | H04J 13/22 370/329 |
| 2013/0286996 A1* | 10/2013 | Takeda | H04L 1/1692 370/329 |
| 2014/0112274 A1 | 4/2014 | Moon et al. | |
| 2014/0321397 A1* | 10/2014 | Shen | H04B 1/69 370/329 |
| 2014/0362804 A1* | 12/2014 | Han | H04L 5/0053 370/329 |
| 2015/0006586 A1 | 1/2015 | Mourad et al. | |
| 2015/0043491 A1 | 2/2015 | Eng et al. | |
| 2015/0049642 A1 | 2/2015 | Eng et al. | |
| 2015/0055727 A1 | 2/2015 | Kim et al. | |
| 2015/0181281 A1 | 6/2015 | Ko et al. | |
| 2015/0195067 A1 | 7/2015 | Kim et al. | |
| 2015/0236884 A1 | 8/2015 | Suh et al. | |
| 2015/0304070 A1 | 10/2015 | Baek et al. | |
| 2015/0358106 A1 | 12/2015 | Limberg et al. | |
| 2016/0057504 A1 | 2/2016 | Shelby et al. | |
| 2016/0065343 A1* | 3/2016 | Kim | H04J 11/0053 370/329 |
| 2016/0094970 A1 | 3/2016 | Oh et al. | |
| 2016/0105223 A1 | 4/2016 | Baek et al. | |
| 2016/0119908 A1 | 4/2016 | Kwak et al. | |
| 2016/0164541 A1 | 6/2016 | Ko et al. | |
| 2016/0164637 A1 | 6/2016 | Suh et al. | |
| 2016/0165273 A1 | 6/2016 | Moon et al. | |
| 2016/0165274 A1 | 6/2016 | Moon et al. | |
| 2016/0173312 A1 | 6/2016 | Moon et al. | |
| 2016/0191288 A1 | 6/2016 | Baek et al. | |
| 2016/0198217 A1 | 7/2016 | Ko et al. | |
| 2016/0241358 A1 | 8/2016 | Ko et al. | |
| 2016/0241365 A1 | 8/2016 | Bae et al. | |

FOREIGN PATENT DOCUMENTS

| | | | |
|---|---|---|---|
| CN | 105024791 A | 11/2015 | |
| CN | 105024952 A | 11/2015 | |
| CN | 105024963 A | 11/2015 | |
| CN | 105245479 A | 1/2016 | |
| CN | 105282076 A | 1/2016 | |
| CN | 105282078 A | 1/2016 | |
| CN | 105323048 A | 2/2016 | |
| CN | 105743624 A | 7/2016 | |
| CN | 105991266 A | 10/2016 | |
| CN | 105991495 A | 10/2016 | |
| CN | 105991498 A | 10/2016 | |
| CN | 105991500 A | 10/2016 | |
| CN | 105991501 A | 10/2016 | |
| CN | 105991502 A | 10/2016 | |
| EP | 2153606 B1 * | 2/2012 | ......... H04L 25/0226 |

OTHER PUBLICATIONS

English translation for Chinese patent publication No. CN 105007145 A, published Oct. 28, 2015, 25 pages, translated by Google at https://patents.google.com.

English translation for Chinese patent publication No. CN 105007146 A, published Oct. 28, 2015, 25 pages, translated by Google at https://patents.google.com.

English translation for Chinese patent publication No. CN 105024791 A, published Nov. 4, 2015, 21 pages, translated by Google at https://patents.google.com.

English translation for Chinese patent publication No. CN 105024952 A, published Nov. 4, 2015, 32 pages, translated by Google at https://patents.google.com.

English translation for Chinese patent publication No. CN 105024963 A, published Nov. 4, 2015, 35 pages, translated by Google at https://patents.google.com.

English translation for Chinese patent publication No. CN 105245479 A, published Jan. 13, 2016, 40 pages, translated by Google at https://patents.google.com.

English translation for Chinese patent publication No. CN 105282076 A, published Jan. 27, 2016, 31 pages, translated by Google at https://patents.google.com.

English translation for Chinese patent publication No. CN 105282078 A, published Jan. 27, 2016, 43 pages, translated by Google at https://patents.google.com.

English translation for Chinese patent publication No. CN 105323048 A, published Feb. 10, 2016, 39 pages, translated by Google at https://patents.google.com.

English translation for Chinese patent publication No. CN 105743624 A, published Jul. 6, 2016, 54 pages, translated by Google at https://patents.google.com.

English translation for Chinese patent publication No. CN 105991266 A, published Oct. 5, 2016, 44 pages, translated by Google at https://patents.google.com.

(56) References Cited

OTHER PUBLICATIONS

English translation for Chinese patent publication No. CN 105991495 A, published Oct. 5, 2016, 32 pages, translated by Google at https://patents.google.com.
English translation for Chinese patent publication No. CN 105991498 A, published Oct. 5, 2016, 93 pages, translated by Google at https://patents.google.com.
English translation for Chinese patent publication No. CN 105991500 A, published Oct. 5, 2016, 76 pages, translated by Google at https://patents.google.com.
English translation for Chinese patent publication No. CN 105991501 A, published Oct. 5, 2016, 80 pages, translated by Google at https://patents.google.com.
English translation for Chinese patent publication No. CN 105991502 A, published Oct. 5, 2016, 39 pages, translated by Google at https://patents.google.com.

* cited by examiner

DYNAMIC CONFIGURATION OF A FLEXIBLE ORTHOGONAL FREQUENCY DIVISION MULTIPLEXING PHY TRANSPORT DATA FRAME PREAMBLE

CROSS-REFERENCE TO RELATED APPLICATIONS

This application claims priority under 35 U.S.C. 119(e) from U.S. Patent Application No. 62/041,478 filed on Aug. 25, 2014, which is incorporated by reference herein in its entirety.

FIELD OF DISCLOSURE

The present disclosure relates to the field of wireless communication, and more particularly, to mechanisms for dynamically constructing Orthogonal Frequency Division Multiplexing ("OFDM") physical transport frame preambles, to enable robust signal detection and service discovery in broadcast networks.

BACKGROUND

In today's world, many electronic devices rely upon wireless connectivity for the reception of data from other connected devices. In a typical wireless deployment, there may be one or more wireless access points that transmit data, and one or more devices that receive data from the wireless access point(s).

In such a scenario, different devices may have different propagation channel characteristics, and these may affect their wireless data reception from the same wireless access point. For example, a device that is near the wireless access point and/or that has a fixed location (or is slowly moving) may have better propagation channel conditions than would a device that is moving at a high velocity and/or that is further away from the wireless access point. The first device may fall into a group of devices that can receive data encoded and transmitted with one set of parameters (such as a high Forward Error Correction (FEC) code rate, a high modulation level, and/or a smaller subcarrier spacing in an Orthogonal Frequency Division Multiplexing (hereinafter referred to as "OFDM") system, while the second device may fall into a group of devices that need data to be encoded and transmitted with a second set of parameters (such as a low FEC code rate, a low modulation level, and/or a wider subcarrier spacing in an OFDM system).

There are many scenarios where a large number of devices may all wish to receive identical data from a common source. One such example is broadcast television, where a large number of television sets in various homes all receive a common broadcast signal conveying a program of interest. In such scenarios, it is significantly more efficient to broadcast or multicast the data to such devices rather than individually signaling the same data to each device. However, programs with different quality levels (e.g. high definition video, standard definition video, etc.) may need to be transmitted to different groups of devices with different propagation channel characteristics. In other scenarios, it may be desirable to transmit device-specific data to a particular device, and the parameters used to encode and transmit that data may depend upon the device's location and/or propagation channel conditions.

As described above, different sets of transmitted data may need to be transmitted with different encoding and transmission parameters, either simultaneously or in a time-multiplexed fashion (or both). The amount of data to be transmitted in a particular data set and/or the encoding and transmission parameters for that data set may vary with time.

At the same time, the demand for high-speed wireless data continues to increase, and it is desirable to make the most efficient use possible of the available wireless resources (such as a certain portion of the wireless spectrum) on a potentially time-varying basis.

SUMMARY

A method for operating a transmitting device to communicate with a receiving device is described herein. The method includes the step of the transmitting device selecting a root index value from a set of root index values. The method further includes the step of the transmitting device generating a frequency domain Constant Amplitude Zero Auto-Correlation sequence based on the selected root index value. The method further includes the step of the transmitting device modulating the Constant Amplitude Zero Auto-Correlation sequence by a pseudo-noise sequence. The method further includes the step of the transmitting device generating an Orthogonal Frequency Division Multiplexing symbol, wherein the frequency domain Constant Amplitude Zero Auto-Correlation sequence modulated by the pseudo-noise sequence defines subcarrier values for the Orthogonal Frequency Division Multiplexing symbol. The method further includes the step of the transmitting device transmitting the Orthogonal Frequency Division Multiplexing symbol as an initial Orthogonal Frequency Division Multiplexing symbol of a preamble of a frame to the receiving device.

A method for operating a receiving device to communicate with a transmitting device is described herein. The method includes the step of the receiving device receiving a set of samples of a signal transmitted by the transmitter. The method further includes the step of the receiving device correlating the sample set against each of a plurality of Constant Amplitude Zero Auto-Correlation sequences modulated by pseudo-noise sequences to detect an initial Orthogonal Frequency Division Multiplexing symbol of a preamble of a frame of the transmitted signal, wherein the Constant Amplitude Zero Auto-Correlation sequences correspond respectively to distinct root index values and the pseudo noise sequences are based on pseudo-noise seed values. The method further includes the step of the receiving device synchronizing an acquisition of symbol data sets corresponding to subsequent Orthogonal Frequency Division Multiplexing symbols of the preamble, wherein the synchronizing of acquisition is based on a correlation peak associated with a particular Constant Amplitude Zero Auto-Correlation sequence that gives a maximal correlation response among the plurality of Constant Amplitude Zero Auto-Correlation sequences.

A method for communicating between a transmitting device and a receiving device is described herein. The method includes the step of a transmitting device generating a sequence of Orthogonal Frequency Division Multiplexing symbols for a preamble of a frame, including generating an initial Orthogonal Frequency Division Multiplexing symbol of the sequence. Subcarrier values of the initial Orthogonal Frequency Division Multiplexing symbol are determined based on a Constant Amplitude Zero Auto-Correlation sequence modulated by an initial portion of a pseudo-noise sequence. The step of the transmitting device generating a sequence of Orthogonal Frequency Division Multiplexing symbols further includes generating a plurality of Orthogonal Frequency Division Multiplexing symbols after the initial Orthogonal Frequency Division Multiplexing symbol. This includes determining subcarrier values for the Orthogonal Frequency Division Multiplexing symbol based on the Constant Amplitude Zero Auto-Correlation sequence modulated by a corresponding non-initial portion of the pseudo-noise sequence; applying a corresponding cyclic shift to the subcarrier values for the Orthogonal Frequency Division Multiplexing symbol; and inverse transforming the subcarrier values to obtain time domain samples for the Orthogonal Frequency Division Multiplexing symbol. The method further includes the step of the transmitting device transmitting the sequence of Orthogonal Frequency Division Multiplexing symbols.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Described herein is an extensible PHY layer signaling framework, and in particular an associated preamble signal design to enable robust detection and service discovery, system synchronization, and receiver configuration. The PHY relies on a preamble sent as an integral part of every transmit frame to allow for sync/detection and system configuration. As will be described, the preamble design includes a flexible signaling approach to convey frame configuration and content control information to the broadcast receiver. The signal design describes the mechanism by which signal parameters are modulated on the physical medium. The signaling protocol describes the specific encoding used to communicate parameter selections governing the transmit frame configuration. This enables reliable service discovery while providing extensibility to accommodate evolving signaling needs from a common frame structure. Specifically, the design of the preamble enables universal signal discovery independent of channel bandwidth. The preamble also enables reliable detection in the presence of a variety of channel impairments such as time dispersion and multipath fading, Doppler shift, and carrier frequency offset. In addition, multiple service contexts are accessible based on mode detection during signal discovery enabling broad flexibility in system configuration. The preamble also facilitates extensibility to accommodate ongoing evolution in service capability based on hierarchical signaling structure. Moreover, reusable bit-fields interpreted based on the detected service mode/type enable bit-efficient signaling despite the level of extensibility afforded.

Figure 1:
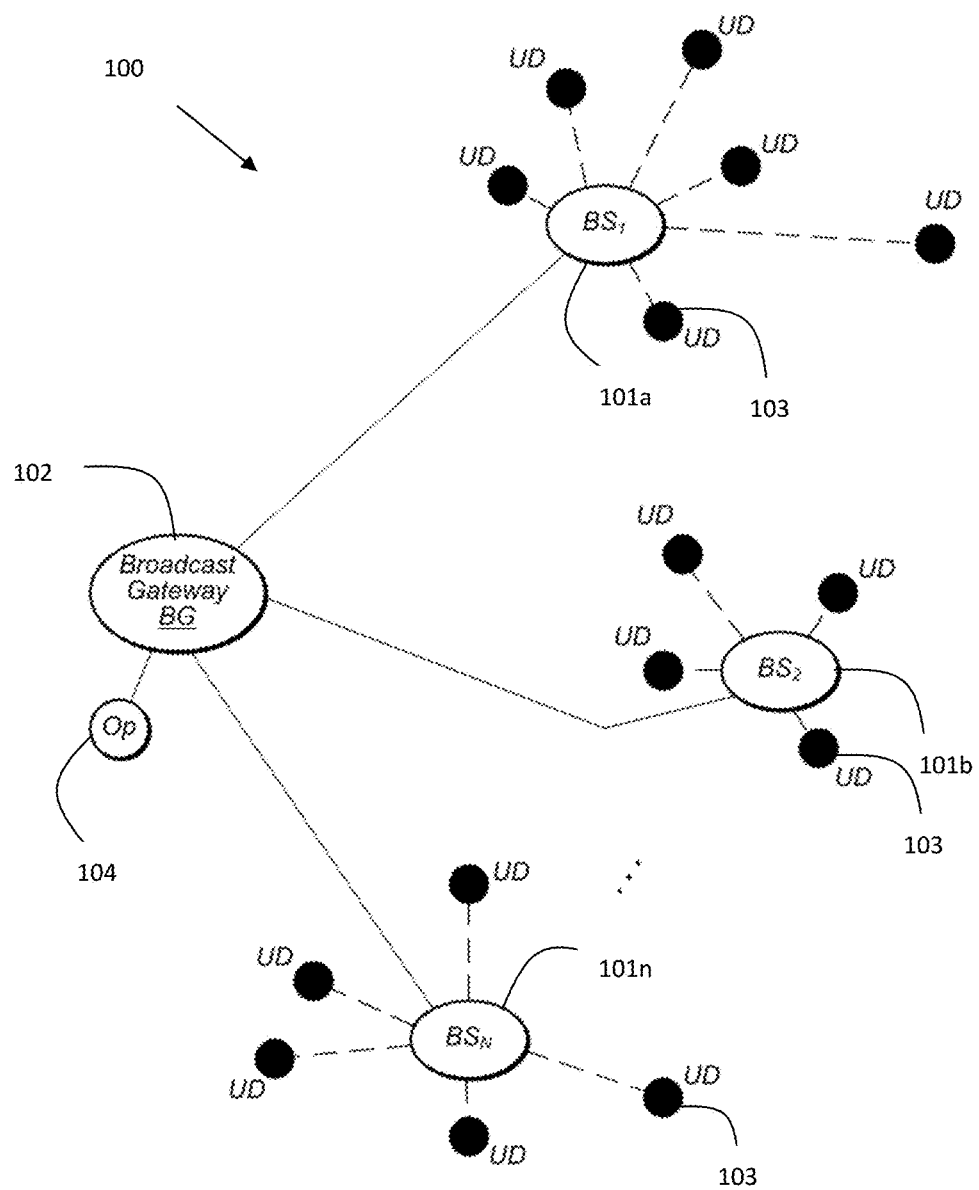
FIG. 1 illustrates an example broadcast network.

FIG. 1 illustrates an example broadcast network 100 that uses the example preamble design described herein. The broadcast network 100 may include a plurality of base stations 101a, 101b . . . 101n, illustratively suggested by base stations $BS_1$, $BS_2$, . . . , $BS_N$ (hereinafter referred to as base stations 101). A broadcast gateway ("BG") 102 may couple to the base stations 101 through any of a variety of communication media. For example, in one embodiment, the broadcast gateway 102 may couple to the base stations 101 via the Internet, or more generally, via a computer network. Each base station 101 wirelessly transmits information to one or more user devices 103. (Each user device UD is denoted by a solid block circle.) Some of the user devices 103 may be fixed devices such as televisions and desktop computers. Other ones of the user devices 103 may be nomadic devices such as tablet computers or laptop computers. Other ones of the user devices 103 may be mobile devices such as mobile phones, automobile-based devices, aircraft-based devices, etc.

An operator ("Op") 104 of the broadcast network 100 may access the broadcast gateway 102 (e.g., via the Internet), and provide network configuration or operating instructions to the gateway 102. For example, the operator 104 may provide information such as one or more of the following items: an expected distribution of user device mobility for one or more of the base stations; the cell size of one or more of the base stations; a selection of whether the broadcast network or a subset of the network is to be operated as a single frequency network (SFN) or a multi-frequency network (MFN); a specification of how different services (e.g., television content streams) are to be assigned to different types of user devices; and identification of portions of bandwidth the broadcast network will not be using over corresponding periods of time.

The broadcast gateway 102 may determine transmission control information for one or more base stations 101 of the broadcast network 100 based on the network configuration or operating instructions. For a given base station, the broadcast gateway 102 may determine: transmission sample rate; number of partitions; sizes of the partitions; FFT size and cyclic prefix size for each partition. The broadcast gateway 102 may send the transmission control information to the base stations 101 so the base stations 101 may construct and transmit frames according to the transmission control information. In other embodiments, the gateway 102 may itself generate frames to be transmitted by each gateway 102 and send the frames to the base stations 101. In yet other embodiments, the gateway 102 may generate low level instructions (e.g., physical layer instructions) for the construction of frames to the base stations 101, and send those instructions to the base stations 101, which may simply generate frames based on the instructions.

Frame Structure

Figure 2:
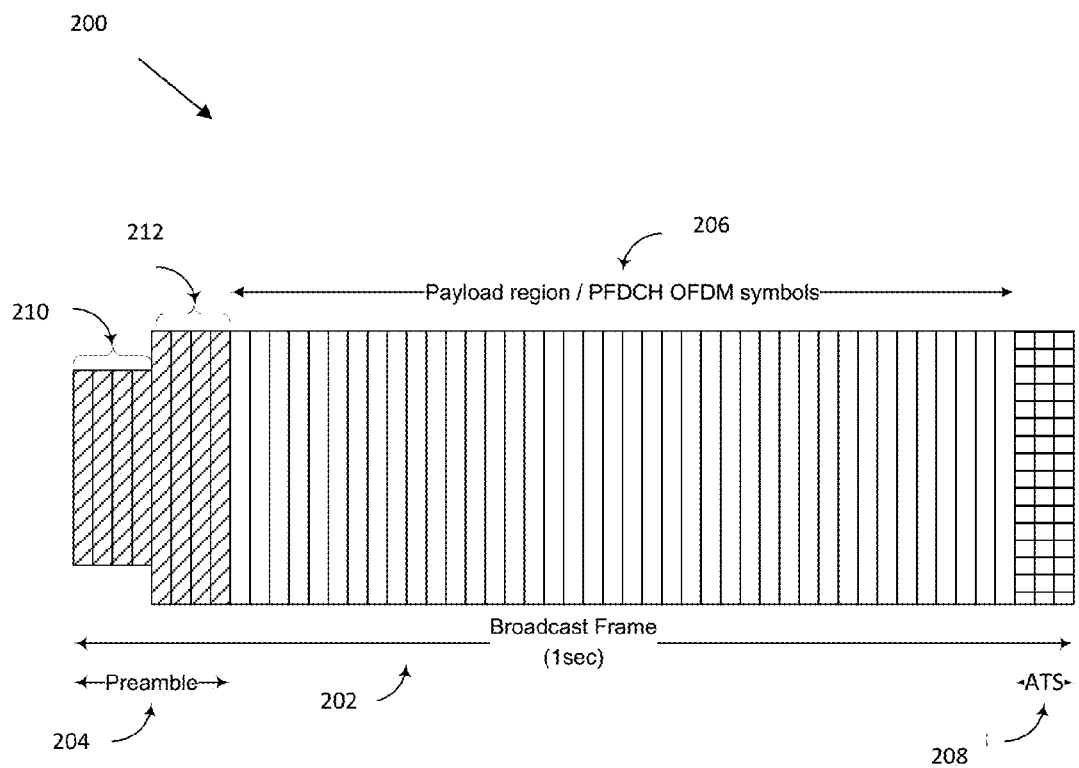
FIG. 2 illustrate an example broadcast frame.

FIG. 2 illustrates an example broadcast frame 200. The frame 200 occupies a specified duration independent of the underlying frame configuration to facilitate coordination with surrounding wireless transports. In this example, the frame 200 has a time duration of one second. However, it should be appreciated that the frame 200 may have other suitable time durations. In one example, the frame length may be dynamically signaled. The broadcast frame 200 can be divided into preamble 204 and payload 206 regions followed by an optional auxiliary termination signal (ATS) field 208. In the example shown, the preamble 204 and ATS 208 regions are indicated by the shaded areas at the beginning and end of the frame 202. The relative lengths in time (horizontal axis) and numbers of symbols for each region are not shown to scale in this example diagram.

The preamble 204 can be further subdivided into frame control 210 (hereinafter referred to as "PFCCH") and content control 212 (herein after referred to as "PCCCH") regions. Responsibilities of the two regions can be summarized as follows. The PFCCH 210 is used to signal the frame configuration to a receive terminal. It describes the signal design and the underlying signaling protocol. Frame configuration may include a combination of one or more of the length of the preamble, the length of the frame, the signal bandwidth and sampling rate, the modulation and coding applied to PCCCH 210, and the presence of ATS. The PFCCH 210 further provides initial synchronization and establishes the frame operating mode. The PFCCH 210 also enables channel estimation and initial carrier frequency offset (CFO) estimation.

The PCCCH 212 is used to signal payload configuration to the receiver. In particular, the PCCCH 212 describes the contents of the payload region including the number of partitions and the signal dimensions, such as the FFT size and CP duration, applied in each partition. The PCCCH 212 also signals the mapping of data streams to each partition including the modulation, coding scheme, and interleaver depth.

Detection of a particular preamble sets the context by which the remaining preamble symbols are interpreted. For example, use of the spectrum by a broadband service would map to a separate context signaled in the broadcast preamble as "private". The broadband operator may choose to define other fields to advertise to the broadcast users. For example, filed may define how long the transport will be occupied and in what signal bandwidth. The broadcast receiver is otherwise instructed to ignore the present frame as belonging to a service context other than that which the broadcast device is equipped to receive.

It should be appreciated that in order for reliable detection in the presence of a variety of channel impairments, certain service requirements may be necessary. For example, to lower the probability of missed detection ("MD") and false alarm ("FA") in additive white Gaussian Noice ("AWGN") and of multipath fading, a maximum Doppler shift and delay spread tolerance may be imposed. In one example, the maximum Doppler shift given an FFT with 3 kHz subcarrier spacing may be 288 MPH (463 KPH) @ 700 MHz or 96 MPH (154 KPH) @ 2100 MHz. In one example, the delay spread tolerance may be 167 μs, or 31 MI (50 KM). It should be appreciated that Doppler tolerance can be increased for a given carrier frequency by skipping subcarriers (i.e. inserting zeroes) at the same spacing to preserve signal bandwidth at the expense of detection reliability and signaling capacity.

PFCCH

The PFCCH 210 provides a universal service entry point for the broadcast receiver. It employs a fixed configuration known to all receive devices. In particular, the PFCCH 210 configuration may include a sampling rate, signal bandwidth, subcarrier spacing, and guard interval known to all receive devices. The PFCCH 210 is initiated with a synchronization symbol positioned at the start of each frame period to enable service discovery, coarse synchronization and initial channel estimation. Parameters governing the frame structure including the symbol configuration used in PCCCH 212 are signaled in the remaining PFCCH 210 symbol periods.

Figure 3:
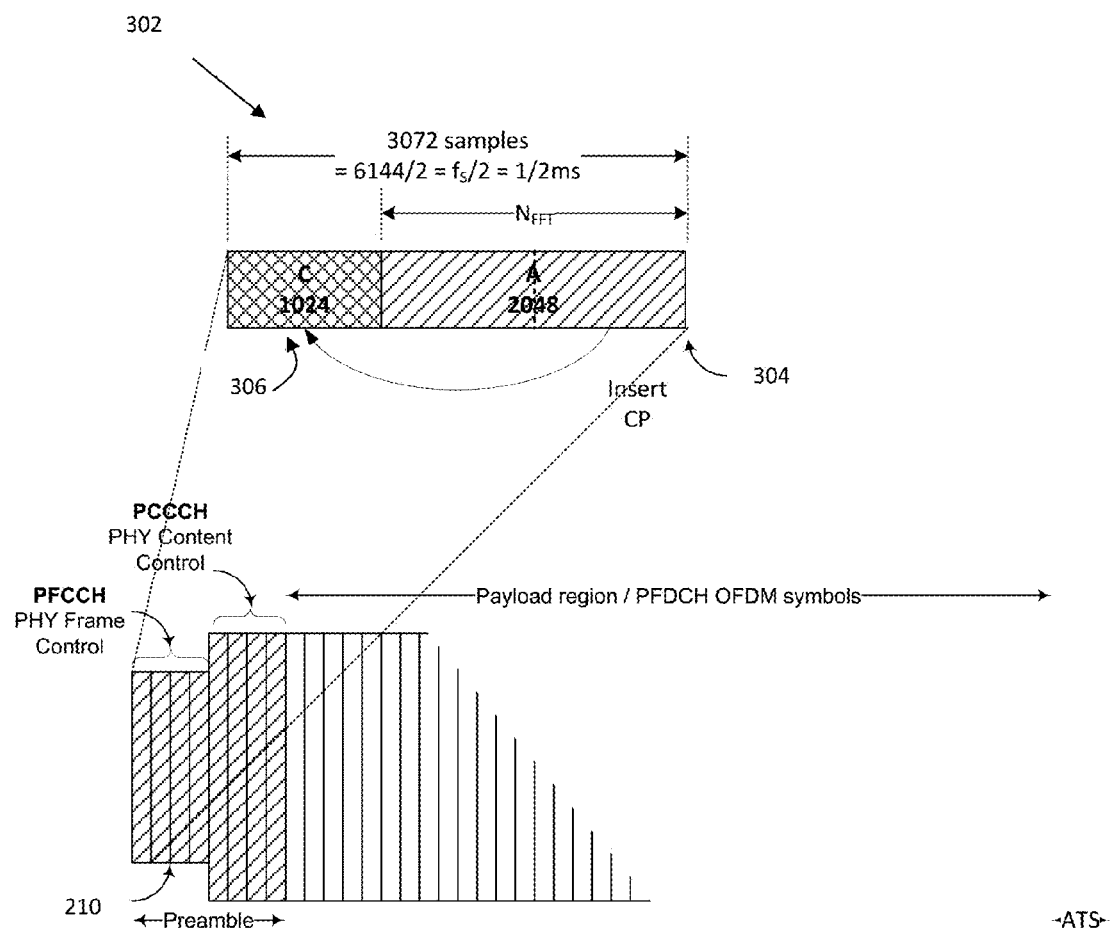
FIG. 3 illustrates example broadcast frame dimensions.

To minimize receiver complexity, PFCCH 210 may be sampled at a fixed frequency. In one example, PFCCH may be sampled at 6.144 Ms/s. The signal is confined to a minimum bandwidth to enable reception by any receiver independent of the assigned channel bandwidth. In one example, the signal may be confined to a minimum 4.5 MHz bandwidth. FIG. 3 illustrates example dimension 302 of a PFCCH 210. The FFT dimension 304 is selected to ensure the required subcarrier spacing. A Cyclic Prefix (CP) 306 is inserted to ensure adequate delay spread tolerance between preamble symbols. Thus, in the example illustrated:

$$B_{SIG} = 4.5 \text{ MHz}, f_S = 6.144 \text{ Ms/s} \quad \text{Equ (1)}$$
$$\Delta f = 3 \text{ kHz}, T_{GI} = 167 \text{ μs}$$
$$N_{FFT} = \frac{f_S}{\Delta f} = 2048$$
$$N_{CP} = T_{GI} \cdot f_S = 1024$$
$$T_{SYM} = (N_{FFT} + N_{CP})/f_s = 500 \text{ μs}$$

Figure 4:
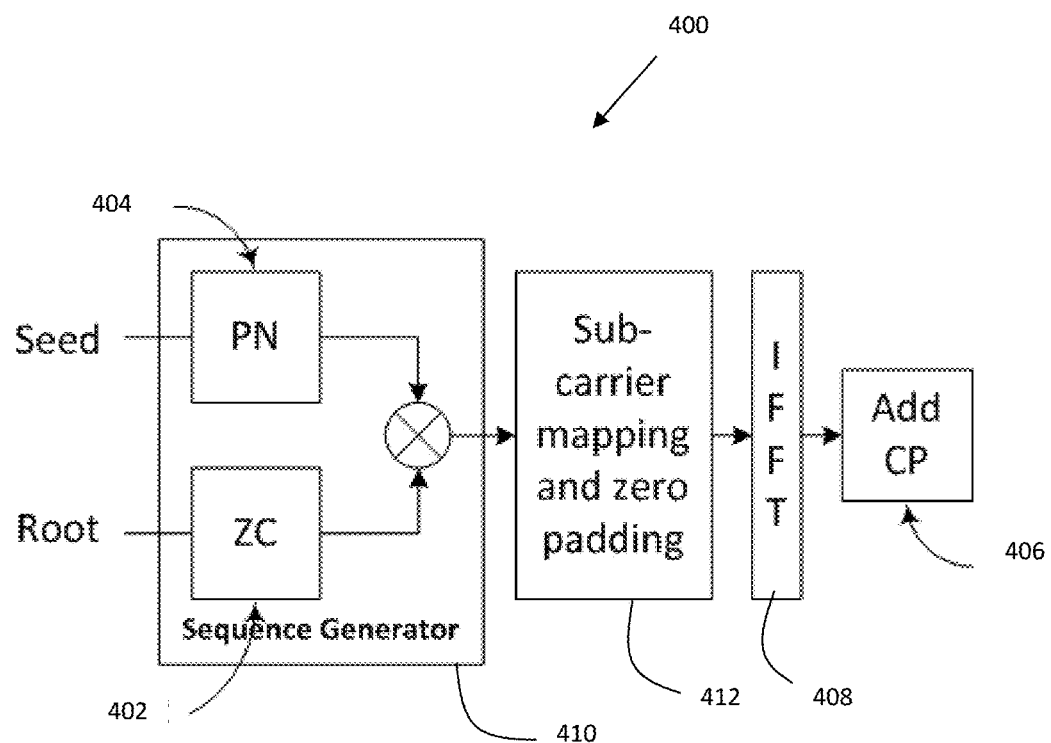
FIG. 4 is an example system for originating an example frame control channel.
Figure 5A:
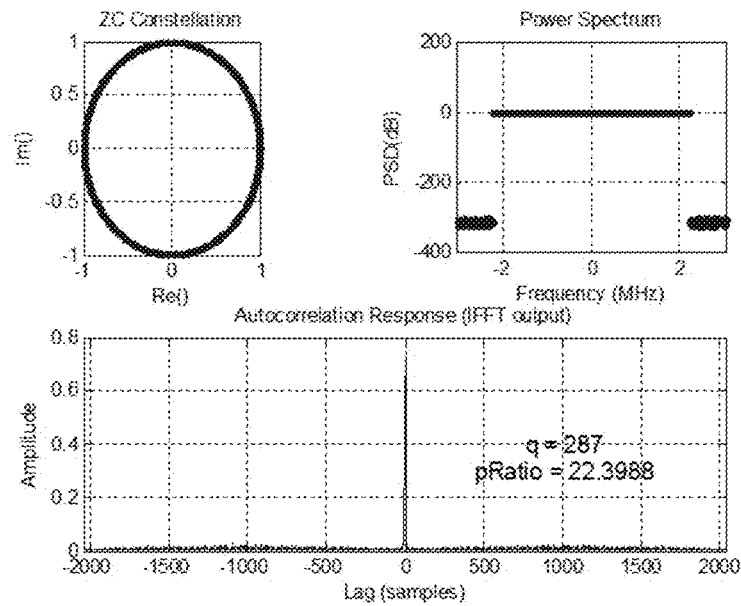
FIGS. 5A-5B, respectively, illustrate example frame control compositions.
Figure 5B:
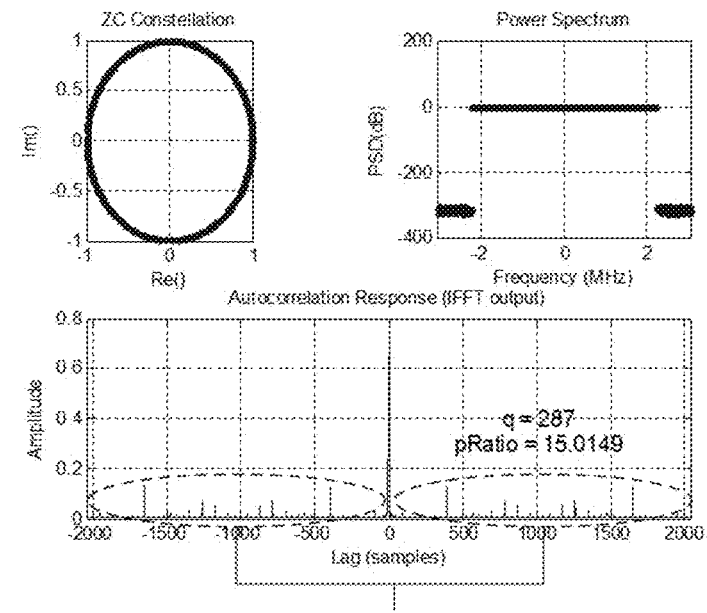

FIG. 4 illustrates as system 400 for originating a PFCCH 210. A PFCCH 210 originates with a Zadoff-Chu ("ZC") sequence 402 modulated in the frequency domain by a pseudo-noise ("PN") sequence 404, with a sequence generator 410. The PN-sequence phase-rotates individual complex subcarriers retaining the desirable Constant Amplitude Zero Autocorrelation Waveform ("CAZAC") properties of the original ZC-sequence, illustrated in FIG. 5A. The added phase rotation is intended to provide greater signal separation between cyclic shifts of the same root sequence suppressing spurious auto-correlation responses observed using a ZC-sequence without the addition of PN-sequence modulation, illustrated in FIG. 5B.

The ZC constitutes a CAZAC sequence exhibiting excellent detection properties characterized by ideal cyclic auto-correlation. For example, the correlation with a cyclic shifted version of itself returns a delta function. The ZC-sequence is defined by a root, q, and cyclic shifts of the root sequence in the frequency domain producing a corresponding lag in the time domain.

$$a_q(n) = e^{-j\pi q \frac{n(n+1)}{N_{ZC}}} \quad \text{Equ (2)}$$

where the ZC root index, $q \in \{1, \ldots, N_{ZC} - 1\}$, $$n = 0, 1, \ldots, N_{ZC} - 1$$

Cyclic shifts of the root sequence can be derived by replacing n in the above equation Equ(2) with some value n-m, where m represents the intended time shift. The root sequence corresponds to m=0. The resulting sequence is computed as:

$$a_q(n, m) = e^{-j\pi q \frac{(n-m)(n-m+1)}{N_{ZC}}} \quad \text{Equ (3)}$$
$$a_q(n, m) = e^{-j\pi q \frac{(n^2 - 2mn + m^2 + n)}{N_{ZC}}}$$

$$a_q(n, m) = a_q(n, 0) \cdot e^{-j\pi q \frac{(m^2 - 2mn)}{N_{ZC}}}$$

where $q \in \{1, \ldots, N_{ZC} - 1\}$, $n = 0, 1, \ldots, N_{ZC} - 1$, $m$ represents the assigned cyclic shift The PN-sequence serves in suppressing spurious off-peak responses observed in some sequence roots. The addition of a PN-sequence provides a reliable means to distinguish the initial symbol intended for sync detection from subsequent symbols in the PFCCH 210. The natural progression of the PN-sequence, reset at the start of the preamble, eliminates the potential for correlation with delayed replicas of the sync detect symbol. It also minimizes the possibility of false detection in the event the initial preamble symbol is missed due to burst noise, shadowing, or a deep channel fade.

Figure 6:
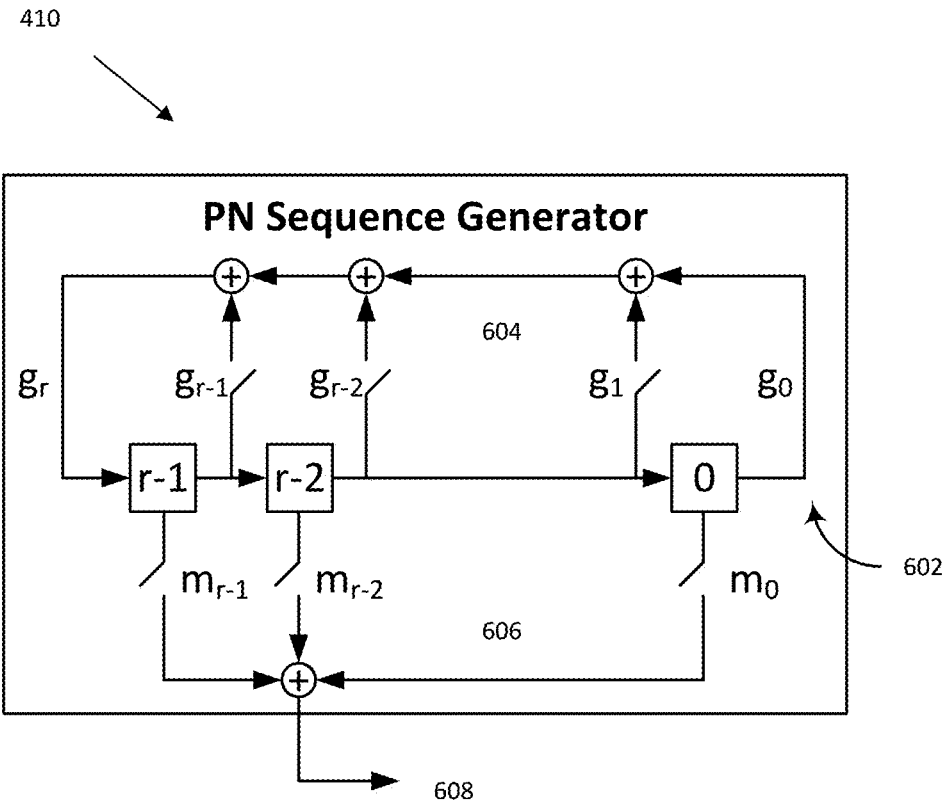
FIG. 6 illustrates an example PN sequence generator.

FIG. 6 illustrates an example sequence generator 410. The PN-sequence generator 410 is derived from a Linear Feedback Shift Register (LFSR) 602. Its operation is governed by a generator polynomial 604 specifying the taps in the LFSR feedback path followed by a mask 606 specifying the elements that contribute to the sequence output 608. Specification of the generator polynomial, mask and initial state of the registers represent a seed. For example a seed=f(g, m, $r_{init}$).

Referring again to FIG. 4, the system 400 includes a sub-carrier mapping module 412 for mapping output of the sequence generator 410 to the Inverse Fast Fourier Transform ("IFFT") 408 input. A CP module 406 is configured to add a CP to the IFFT 408 output.

In one example, the PN sequence is mapped to Quadrature Phase Shift Keying ("QPSK") symbols providing $\{\pm\pi/4, \pm 3\pi/4\}$ rotations per subcarrier relative to the root ZC sequence at the IFFT 408 input modulating the real and imaginary signal components (i.e. I, Q) independently. In one example, Binary Phase-shift Keying ("BPSK") modulation can be used as well, providing $\{0,\pi\}$ rotations with presumably less separation given that I and Q-signals are no longer modulated independently.

A PFCCH symbol 210 is configured to maximize use of the available signal bandwidth. The subcarrier mapping is additionally constrained to permit use of a prime-length ZC sequence. Therefore:

$$N_{SC} = \left\lfloor \frac{B_{SIG}}{\Delta f} \right\rfloor - 1(\text{null}) = 1499 \qquad \text{Equ (4)}$$

$$N_{ZC} = \max[1: N_{SC}], N_{ZC} \in \mathbb{N}_P$$

The outputs of the complex sequence generator 410 are mapped by the sub-carrier mapping module 412 to the IFFT 408 input on either side of the DC subcarrier. Given an odd length sequence, one additional subcarrier is mapped to the negative frequencies such that an equal number of subcarriers are mapped to negative and positive frequencies where positive frequencies include DC.

The IFFT 408 output is cyclically extended by the CP module 406 to account for channel delay spread. The CP length is selected to exceed the maximum expected delay spread tolerance. Thus:

$$T_{CP} = \frac{N_{CP}}{f_S} = 167 \, \mu s \qquad \text{Equ (5)}$$

Figure 7:
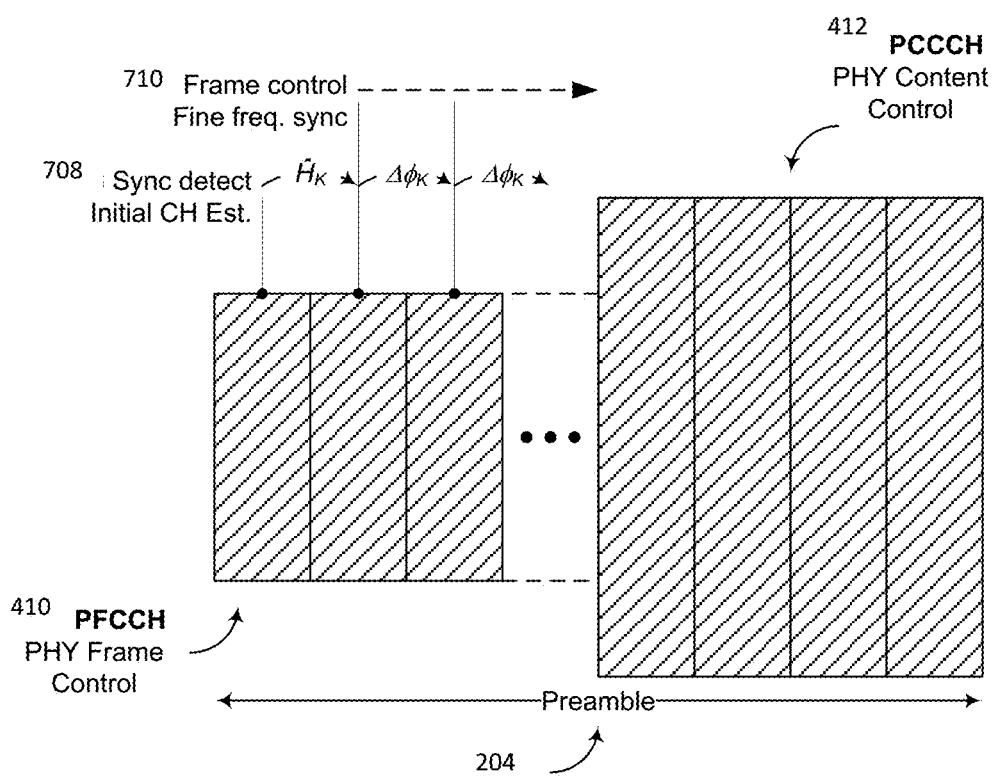
FIG. 7 illustrates example frame control subcarrier mapping.
Figure 8:
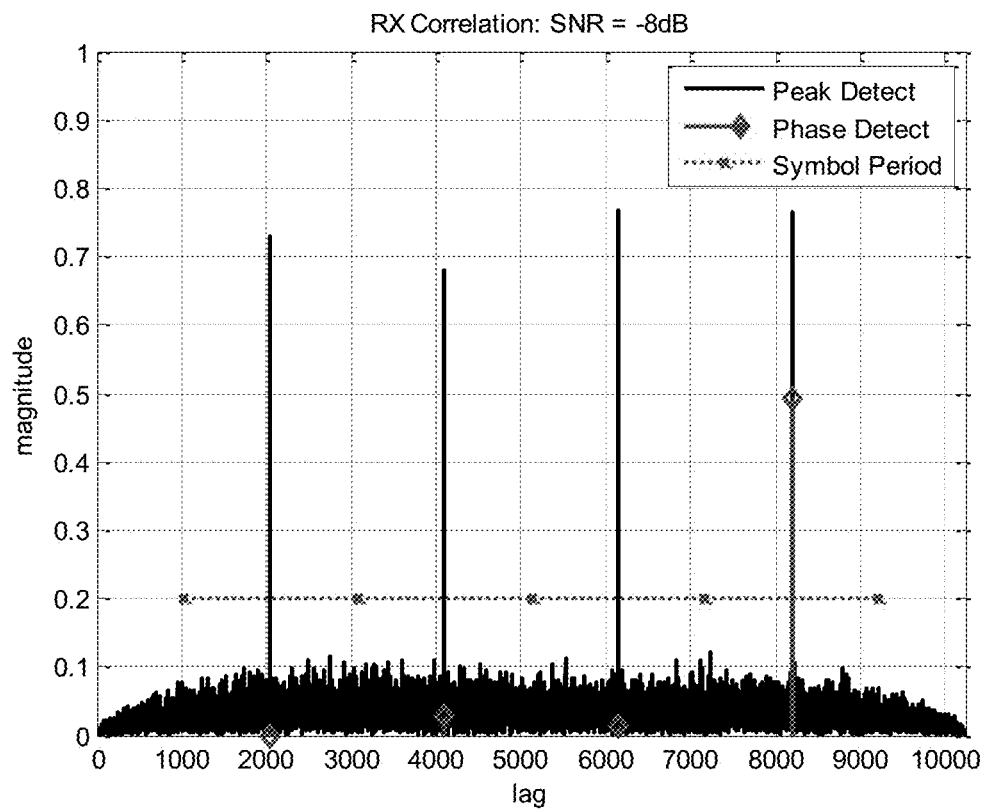
FIG. 8 illustrates example field termination signaling.

FIG. 7 illustrates an example progression through PFCCH 410 symbol contents to the PCCCH 412 contents of preamble 204. The first transmitted PFCCH symbol 708 provides sync detection and mode selection. It is also used for channel estimation. In one example, Sync detection is based on correlation to one of many prescribed roots of the ZC sequence (zero cyclic shift). In one example, the detected root sequence, including PN-modulation, determines the service type/mode carried in the frame. For example, service type/mode may include ONE Media Standalone Transmission, ONE Media Transmission under configuration control of a Broadcast Management Exchange (BMX), ONE Media BMX Beacon, Private Use, or another suitable service type/mode. The root sequence might additionally identify separate service classes, operating modes, transmitters/service operators, and so on.

In one example, channel estimation is performed at the receiver based on cross correlation with a local copy of the detected root sequence, including PN-modulation. The channel estimate is used in compensating for channel effects, time dispersion in particular, prior to decoding the remaining PCCCH symbols 412.

Cyclic shifts of the detected root sequence are applied in symbols 710 following initial sync detection, i.e. secondary symbol periods, to convey the frame configuration. In one example, observed or estimated cyclic shift is mapped to an assigned bit-field, the meaning of which is specific to a current symbol period, such as proximity to the sync detect symbol, interpreted relative to the context set by the detected service mode.

In one example, the interpretation in a secondary symbol period might additionally depend on the context set in a preceding symbol period. For instance, the transmitter might sub-divide the permissible cyclic shifts in a given symbol period to establish separate contexts thereby extending the signaling hierarchy to multiple levels below the detected service type.

In one example, parameters signaled in the secondary symbol periods may include one or more of frame count, frame duration, signal bandwidth employed in PCCCH as well as the frame payload, the PCCCH FFT size and CP length, the PCCCH modulation, and code rate.

In one example, delayed correlation with the CP is computed per secondary symbol to refine frequency offset estimates, compensation for which is applied in the next symbol period.

Figure 9:
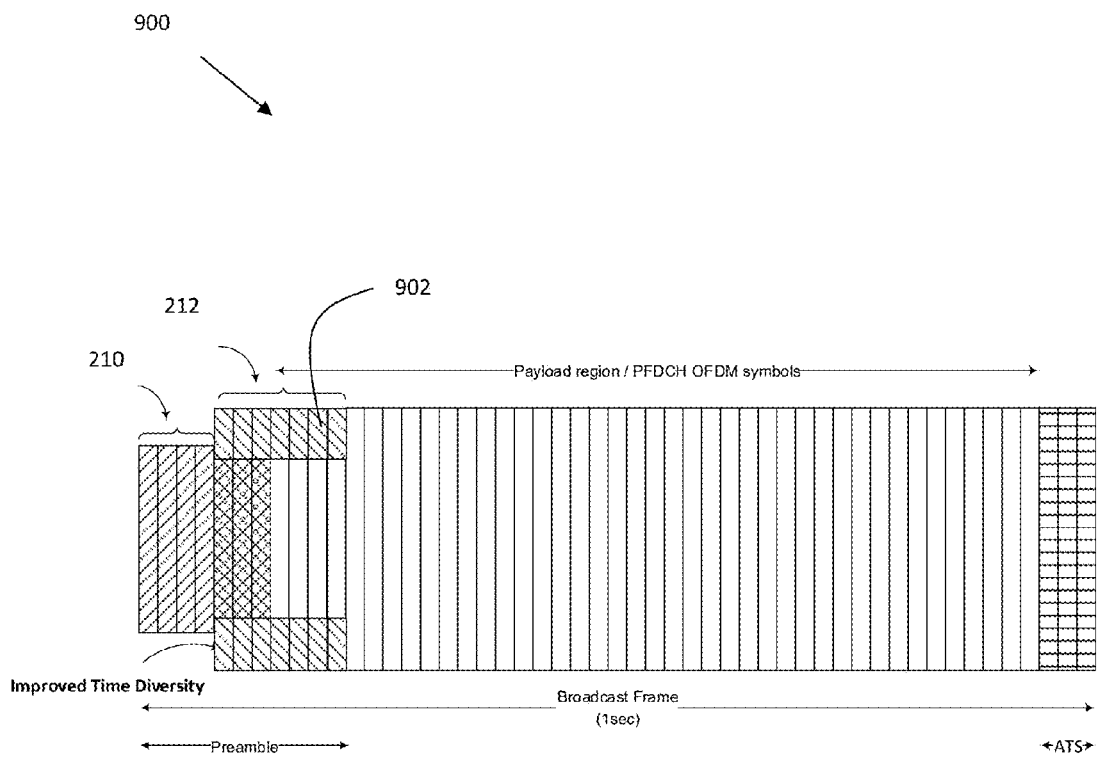
FIG. 9 illustrates an example frame including partitions.

As illustrated in FIG. 9, the sequence transmitted in the final symbol period is inverted (i.e. rotated 180°) signaling the end of PFCCH 410. In one example, the final PFCCH 410 symbol includes a cyclic shift as needed to convey parameter selection as described above. In one example, inverting the phase of the sequence provides an efficient means to indicate the start of PCCCH 412 in the next symbol period while permitting the length of PFCCH 410 to be extended to increase signaling capacity as needed.

PCCCH

The PCCCH 412 contains information necessary for a terminal to decode the frame payload and extract portions or programs of interest. In one example, the PCCCH 412 includes the number of frame partitions.

In one example, the PCCCH 412 includes, for each partition, physical resources allocated to that partition. This may include the number of OFDM symbols allocated to that partition, as well as which particular symbols are allocated to that partition. It should be appreciated that distinct partition may be interleaved with each other. The PCCCH 412 may also include, for each partition, FFT size and Cyclic prefix length. In one example, the PCCCH 412 may also include the number of partitions in the frame.

In one example, the PCCCH 412 includes, for each service data stream, service associated with that stream, physical resources allocated to that stream, modulation used for that stream, and transport block size in bytes.

In one example, the PCCCH 412 includes the presence/absence of an Auxiliary Termination Symbol (ATS) used to allow for transmitter ID, position/location information, discontinuous reception, and so on.

It should be appreciated that PCCCH is carried using conventional OFDM symbols, the bandwidth, FFT size, and CP length of which are set in accordance with the parameter settings communicated as part of PFCCH.

The modulation, code rate, and pilot density are also set according to parameters sent in PFCCH. The intent is to provision signaling in a manner that just exceeds the reliability of the payload symbols. For example, there is no benefit in using QPSK with a very low code rate for signaling given a frame that contains a 256-QAM payload sent with a relatively high code rate (i.e. minimal redundancy). Instead, higher order modulation and a higher code rate are used for signaling as well to minimize overhead.

In one example, partitioning PCCCH is introduced to account for the potential to encounter different channel conditions, potentially for different service deployments. Different channel conditions may include, for example, mobile vs. fixed as well as the possibility of mixing mobile and fixed in the same transport.

FIG. 9 illustrates an example frame 900 including the PFCCH 210 and the PCCCH 212 divided into partitions 902. Reception under slow mobility, such as pedestrian speeds, is plagued by flat fading characterized by significant signal attenuation across all frequencies for brief periods of time. A deep fade can last tens of microseconds (µs) compromising data integrity for whole symbol periods regardless of the assigned modulation order and code rate. The data loss has potential to affect signaling as well as data reception. PFCCH 210 benefits from substantial signal processing gain providing robustness at SNR levels well below the requirements for payload data reception. On the other hand, PCCCH 212 is closer in composition to the frame payload making it equally vulnerable to this kind of fading. Thus, dividing PCCCH 212 into partitions 902 enables different methods of encoding to address different deployment scenarios.

It should be appreciated that, in one example, partitioning as signaled in PFCCH improves time diversity increasing the reliability of PCCCH reception.

In one example, benign channels (Fixed/Ricean) employ one method of Coding, Modulation, and Time Diversity and pedestrian channels (Raleigh/Flat Fading) would employ an alternate method of Coding, Modulation, and Time Diversity.

In one example, a scheduler is responsible for provisioning.

In one example, the encoding shows a signal that is compact in time and spans the centermost frequencies of the band. This kind of signaling may be well suited for fixed reception where the potential to encounter flat fading is nearly non-existent. In another example, an alternate encoding may spread the signal over a larger number of symbol periods occupying resources placed at the band edges, perhaps alternating per symbol period for additional frequency diversity. This arrangement may be better suited for mobile reception where multiple symbol periods may be compromised due to flat fading. The likelihood of signal recovery may be greatly improved given the added time and frequency diversity.

Given the manner in which the two encodings are separated in frequency, the possibility exists to send both signal encodings at the same time, once in a manner best suited for fixed reception and once in a manner best suited for mobile reception. In one example, the contents of the fixed signaling method might be limited to that needed by the fixed receiver, such as which frame partition(s) to monitor and the periodicity of the corresponding payload symbols. Likewise, the contents of the mobile signaling method may be restricted to the partitions and symbol periods corresponding to the mobile service.

Figure 10:
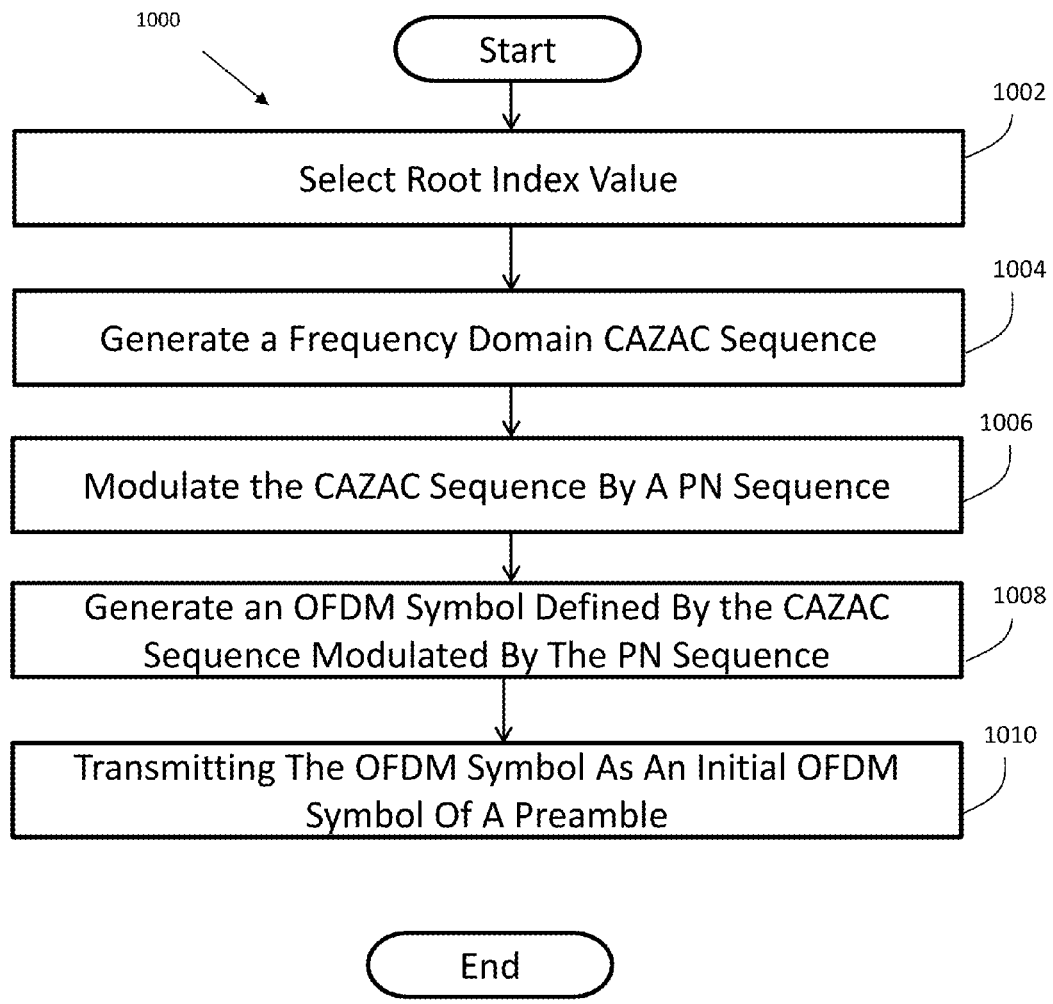
FIG. 10 an example method for operating a transmitting device.

FIG. 10 illustrates an example method for operating a transmitting device. At step 1002, a transmitting device selects a root index value from a set of index values. At step 1004, the transmitting device generates a frequency domain CAZAC sequence based on the selected root index value. At step 1006, the transmitting device modulates the CAZAC sequence by a PN sequence. At step 1008, the transmitting device generates a OFDM symbol defined by the CAZAC sequence modulated by the PN sequence. At step 1010, the transmitting device transmits the OFDM symbol as an initial OFDM symbol of a preamble.

Figure 11:
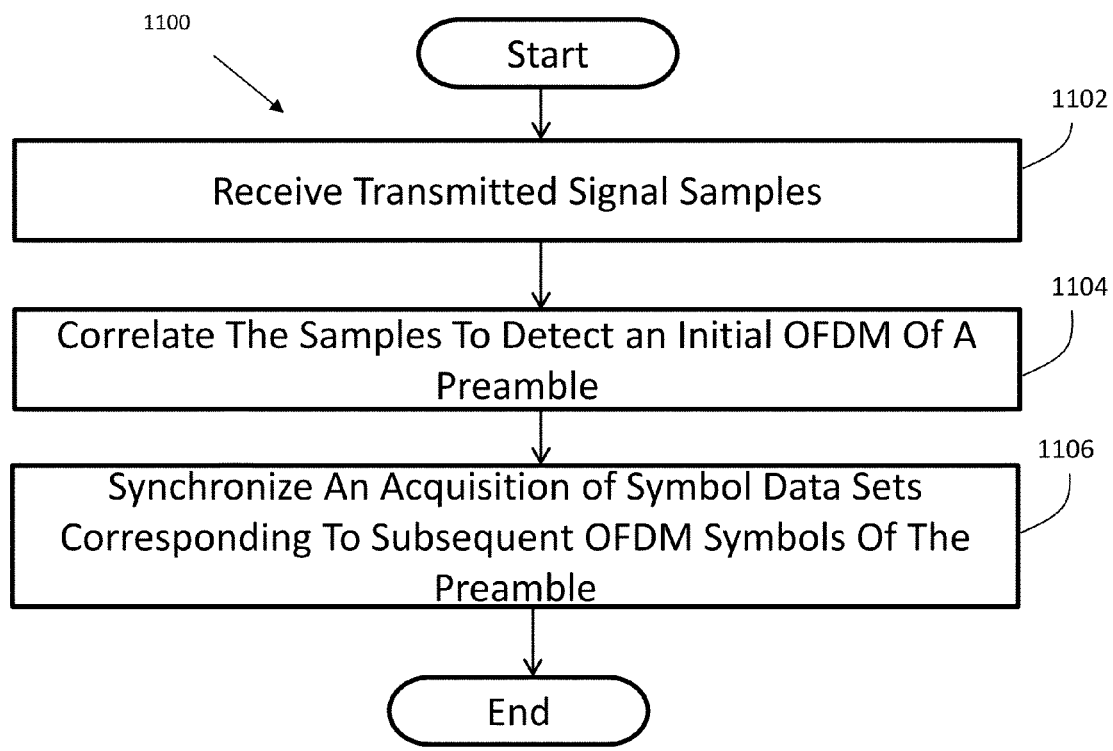
FIG. 11 illustrates an example method for operating a receiving device.

FIG. 11 illustrates an example method for operating a receiving device. At step 1102, a receiving device receives a set of samples of a signal transmitted by the transmitter. At step 1104, the receiving device correlates the sample set against each of a plurality of CAZAC sequences modulated by P-N sequences to detect an initial OFDM symbol of a preamble of a frame of the transmitted signal, wherein the CAZAC sequences correspond respectively to distinct root index values and the P-N sequences are based on P-N seed values. At step 1106, the receiving device synchronizes an acquisition of symbol data sets corresponding to subsequent OFDM symbols of the preamble, wherein the synchronizing of acquisition is based on a correlation peak associated with a particular CAZAC sequence that gives a maximal correlation response among the plurality of CAZAC sequences.

Any of the various embodiments described herein may be realized in any of various forms, e.g., as a computer-implemented method, as a computer-readable memory medium, as a computer system, etc. A system may be realized by one or more custom-designed hardware devices such as Application Specific Integrated Circuits (ASICs), by one or more programmable hardware elements such as Field Programmable Gate Arrays (FPGAs), by one or more processors executing stored program instructions, or by any combination of the foregoing.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a mobile device, a wearable computer, a sensing device, a television, a video acquisition device, a computer embedded in a living organism, etc. The computer system may include one or more display devices. Any of the various computational results disclosed herein may be displayed via a display device or otherwise presented as output via a user interface device.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A method for operating a transmitting device to communicate with a receiving device, the method comprising:
   the transmitting device selecting a root index value from a set of root index values;
   the transmitting device generating a frequency domain Constant Amplitude Zero Auto-Correlation (CAZAC) sequence based on the selected root index value;
   the transmitting device modulating the frequency domain CAZAC sequence by a pseudo-noise (PN) sequence to generate a complex sequence;
   the transmitting device generating an Orthogonal Frequency Division Multiplexing (OFDM) symbol by mapping the complex sequence to a plurality of subcarriers;
   the transmitting device transmitting the OFDM symbol as an initial OFDM symbol of a preamble of a frame to the receiving device; and
   the transmitting device generating subsequent OFDM symbols of the preamble, the generating of subsequent OFDM symbols of the preamble comprising:
      applying respective cyclic shifts to the frequency domain CAZAC sequence, wherein each of the respective cyclic shifts is selected from a set of cyclic shifts based on respective frame configuration information; and
      transmitting the subsequent OFDM symbols in the preamble of the frame.

2. The method of claim 1, wherein the initial OFDM symbol comprises a frame control symbol configured to provide initial synchronization.

3. The method of claim 1, wherein the frequency domain CAZAC sequence includes a Zadoff-Chu (ZC) sequence.

4. The method of claim 1, wherein the frequency domain CAZAC sequence indicates a service type provided by the frame, from a set of service types.

5. The method of claim 1, wherein the subsequent OFDM symbols in the preamble of the frame comprise content control symbols configured to describe contents of the frame.

6. The method of claim 1, further comprising the transmitting device applying a phase inversion operation to at least one of the subsequent OFDM symbols prior to transmitting the subsequent OFDM symbols.

7. The method of claim 1, wherein frame configuration information signaled by an OFDM symbol of the subsequent OFDM symbols is based on prior frame configuration information signaled by a prior OFDM symbol of the subsequent OFDM symbols, the OFDM symbol being after the prior OFDM symbol among the subsequent OFDM symbols.

8. A method for operating a receiving device to communicate with a transmitting device, the method comprising:
   the receiving device receiving a set of samples of a signal transmitted by the transmitting device;
   the receiving device correlating the set of samples against each of a plurality of Constant Amplitude Zero Auto-Correlation (CAZAC) sequences modulated by pseudo-noise (PN) sequences to detect an initial Orthogonal Frequency Division Multiplexing (OFDM) symbol of a preamble of a frame of the transmitted signal, wherein the CAZAC sequences correspond respectively to distinct root index values and the PN sequences are based on PN seed values;
   the receiving device identifying a particular CAZAC sequence from among the plurality of CAZAC sequences, the particular CAZAC sequence corresponding to a maximal correlation response; and
   the receiving device obtaining subsequent OFDM symbols of the preamble based on the particular CAZAC sequence, wherein the subsequent OFDM symbols include symbol data sets.

9. The method of claim 8, wherein the plurality of CAZAC sequences each includes a Zadoff-Chu sequence.

10. The method of claim 8, wherein the particular CAZAC sequence indicates a service type for the frame.

11. The method of claim 8, further comprising the receiving device, for each of the symbol data sets, determining a corresponding cyclic shift relative to the particular CAZAC sequence, wherein corresponding frame configuration information is based at least in part on the corresponding cyclic shift and the particular CAZAC sequence.

12. The method of claim 8, wherein frame configuration information signaled by an OFDM symbol of the subsequent OFDM symbols is based on prior frame configuration information signaled by a prior OFDM symbol of the subsequent OFDM symbols, the OFDM symbol being after the prior OFDM symbol among the subsequent OFDM symbols.

13. A method for communicating between a transmitting device and a receiving device, the method comprising:
modulating a Constant Amplitude Zero Auto-Correlation (CAZAC) sequence by a pseudo-noise (PN) sequence to generate a complex sequence;
mapping the complex sequence to a plurality of subcarriers to generate first subcarrier values for an initial Orthogonal Frequency Division Multiplexing (OFDM) symbol;
applying a cyclic shift to the CAZAC sequence to generate a cyclically shifted CAZAC sequence;
modulating the cyclically shifted CAZAC sequence by the PN sequence to generate a second complex sequence;
mapping the second complex sequence to the plurality of subcarriers to generate second subcarrier values for a subsequent OFDM symbol; and
transmitting the initial and subsequent OFDM symbols in a frame preamble.

14. The method of claim 13, further comprising generating the PN sequence using a linear feedback shift register.

15. The method of claim 13, further comprising:
inverting the second complex sequence when the subsequent OFDM symbol corresponds to a last OFDM symbol of the frame preamble.

16. The method of claim 13, further comprising:
applying an Inverse Fast Fourier Transform (IFFT) to the first subcarrier values to generate the initial OFDM symbol.

17. A transmitting device, comprising:
a memory storing program instructions; and
a processor, upon executing the program instructions, configured to:
select a root index value from a set of root index values;
generate a frequency domain Constant Amplitude Zero Auto-Correlation (CAZAC) sequence based on the selected root index value;
modulate the frequency domain CAZAC sequence by a pseudo-noise (PN) sequence to generate a complex sequence;
map the complex sequence to a plurality of subcarriers to determine subcarrier values for an initial Orthogonal Frequency Division Multiplexing (OFDM) symbol of a frame preamble;
apply a cyclic shift to the frequency domain CAZAC sequence to generate a cyclically shifted CAZAC sequence, wherein the cyclically shifted CAZAC sequence is modulated by the PN sequence to generate a second complex sequence; and
map the second complex sequence to the plurality of subcarriers to generate subsequent subcarrier values for a subsequent OFDM symbol of the frame preamble.

18. The transmitting device of claim 17, wherein the root index value includes a non-prime value.

19. The transmitting device of claim 17, wherein the processor, upon executing the program instructions, is further configured to:
apply an Inverse Fast Fourier Transform (IFFT) to the subcarrier values to generate the initial OFDM symbol; and
transmit the initial OFDM symbol to a receiving device.

20. The transmitting device of claim 17, wherein the frequency domain CAZAC sequence includes a Zadoff-Chu (ZC) sequence.

21. The transmitting device of claim 17, wherein the processor, upon executing the instructions, is further configured to:
invert the second complex sequence when the subsequent OFDM symbol corresponds to a last OFDM symbol of the frame preamble.

22. A method for enhancing detection of an initial Orthogonal Frequency Division Multiplexing (OFDM) symbol of a frame preamble, comprising:
generating a Zadoff-Chu (ZC) sequence using a root index value selected from a set of root index values including prime and non-prime root index values;
modulating the ZC sequence by a pseudo-noise (PN) sequence to generate a complex sequence;
generating the initial OFDM symbol based on the complex sequence;
transmitting the initial OFDM symbol to a receiver in a first symbol period of the frame preamble;
cyclically shifting the ZC sequence to generate a cyclically shifted ZC sequence;
modulating the cyclically shifted ZC sequence by the PN sequence to generate a second complex sequence;
generating a subsequent OFDM symbol based on the second complex sequence; and
transmitting the subsequent OFDM symbol to the receiver in a second symbol period of the frame preamble adjacent to the first symbol period.

* * * * *